United States Patent
Weber et al.

(10) Patent No.: US 7,605,927 B2
(45) Date of Patent: Oct. 20, 2009

(54) APPARATUS FOR OPTICALLY DETERMINING THE PROFILE AND/OR UPPER SURFACE PROPERTIES OF FLAT WORKPIECES IN A WIDE BELT ABRADING MACHINE

(75) Inventors: Georg Weber, Kronach (DE); Rudolf Köhler, Krefeld (DE); Gerhard Josef Abraham, Vienna (AU)

(73) Assignee: Hans Weber Maschinenfabrik GmbH, Kronach (DE)

( * ) Notice: Subject to any disclaimer, the term of this patent is extended or adjusted under 35 U.S.C. 154(b) by 92 days.

(21) Appl. No.: 11/724,572

(22) Filed: Mar. 15, 2007

(65) Prior Publication Data

US 2007/0223010 A1 Sep. 27, 2007

Related U.S. Application Data

(63) Continuation-in-part of application No. 11/509,941, filed on Aug. 25, 2006, now abandoned.

(30) Foreign Application Priority Data

Mar. 21, 2006 (DE) .................. 10 2006 012 941
Aug. 10, 2006 (DE) .................. 10 2006 037 508

(51) Int. Cl.
G01B 11/24 (2006.01)
(52) U.S. Cl. .................. 356/601; 356/612
(58) Field of Classification Search ........... 356/601, 356/612, 445–448; 318/640; 116/230; 118/504–505
See application file for complete search history.

(56) References Cited

U.S. PATENT DOCUMENTS

| 3,636,361 | A | * | 1/1972 | Bowers ............... 250/349 |
| 4,601,134 | A | | 7/1986 | Hessemann |
| 4,671,022 | A | * | 6/1987 | Williams ............. 451/2 |
| 5,033,845 | A | * | 7/1991 | Sorimachi et al. ..... 356/3.01 |
| 5,229,835 | A | * | 7/1993 | Reinsch .............. 356/600 |
| 5,341,214 | A | * | 8/1994 | Wong ................. 356/437 |
| 5,608,211 | A | * | 3/1997 | Hirono et al. ......... 250/234 |
| 2006/0025046 | A1 | * | 2/2006 | Billig ................ 451/5 |

FOREIGN PATENT DOCUMENTS

DE 3402104 A1 8/1985

* cited by examiner

Primary Examiner—Gregory J Toatley, Jr.
Assistant Examiner—Tri T Ton
(74) Attorney, Agent, or Firm—McCormick, Paulding & Huber LLP

(57) ABSTRACT

An elongated bar shaped housing contains an optical sensing apparatus with at least one light source to create a sensing beam and a deflecting arrangement which moves the sensing beam back and forth between the longitudinal ends of the housing. One of the walls of the housing has an output window extending in the longitudinal direction of the housing for the sensing beam and an input window parallel to the output window for the sensing beam reflected from a workpiece or its support. In the housing behind the input window there is a strip shaped light receiving arrangement with a plurality of optical sensors, as well as an evaluation unit connected to the light receiving arrangement to which the output signals of the light receiving arrangement are sent.

15 Claims, 4 Drawing Sheets

APPARATUS FOR OPTICALLY DETERMINING THE PROFILE AND/OR UPPER SURFACE PROPERTIES OF FLAT WORKPIECES IN A WIDE BELT ABRADING MACHINE

CROSS REFERENCE TO RELATED APPLICATIONS

This application is a continuation-in-part of U.S. application Ser. No. 11/509,941, filed on Aug. 25, 2006 and for which Applicants also hereby claim foreign priority benefits under 35 U.S.C. § 119 of German Patent Application No. 10 2006 012 941.5 filed Mar. 21, 2006 and German Patent Application No. 10 2006 037 508.4 filed Aug. 10, 2006, the disclosures of which are herein incorporated by reference in their entirety.

BACKGROUND OF THE INVENTION

1. Technical Field

The invention concerns an apparatus for optically determining the profile and/or the upper surface properties of flat workpieces in a wide belt abrading machine.

2. Background Art

A belt abrading machine is known, from DE 32 02 104 A1, which has a presser bar extending transversely to the advancement direction of a workpiece and having a number of presser shoes arranged next to one another for pressing the abrading belt onto the upper surface of the workpiece. In it the pressing force of each presser shoe is individually controllable in dependency on the contours of the workpieces on a transport belt running under the abrading belt. For this the workpieces are sensed by means of detectors, for example non-contactingly by laser light fences. The detectors are arranged next to one another transversely to the transport direction of the workpieces, with each presser shoe of the presser bar having several detectors arranged in a row with it.

The optical detectors allow a better resolution than mechanical scanner elements, are however expensive in their multiplicity, and under the operating conditions of an abrading machine are capable of being disturbed by the yielded abrasion dust.

SUMMARY OF THE INVENTION

The invention has as its basic object the provision of an apparatus of the previously mentioned kind whereby with higher spatial resolution less expense is necessary and the apparatus is less capable of being disturbed.

This object is solved in accordance with the invention by an elongated bar shaped housing containing an optical sensing apparatus with at least one light source to create a sensing beam and a deflecting arrangement which moves the sensing beam back and forth between the longitudinal ends of the housing, and in that one of the walls of the housing has an output window extending in the longitudinal direction of the housing for the sensing beam and an input window parallel to the output window for the sensing beam reflected from a workpiece or its support, with there being in the housing behind the input window a strip shaped light receiving arrangement with a plurality of optical sensors, as well as an evaluation unit connected to the light receiving arrangement to which the output signals of the light receiving arrangement are sent.

In the solution of the invention the sensitive optical elements are given protection in the housing and thereby are protected against the environmental influences inside the abrading machine, especially against the penetration and depositing of abrasion dust. Dust cannot stick as easily to the flat windows of the housing. Moreover it is easier to clean said windows. At the same time by means of the roaming sensing beam the entire working width of the abrading machine can be continuously sensed, so that a high spatial resolution is possible, which is essentially limited only by the arrangement of the optical sensors.

In practice the precision of the sensing can be disturbed by the widening of the sensing beam on its way from the deflecting device to the workpiece, by the diffusion of the light of the sensing beam and by the light reflection.

These problems in a first embodiment can be solved in that the deflecting device includes a position sensor whose output signal contains information for determining the deflection direction of the sensing beam. If the deflecting device is made for example with a rotatable mirror, this mirror or its drive can be coupled to an angular position detector.

According to a second embodiment the sensing beam has associated with it a reference beam which reference beam inside of the housing is directed onto a second strip shaped light receiver arrangement with a plurality of optical sensors and along which second strip the reference beam is deflected in synchronism with the sensing beam, with the output signals of both light receiving arrangements being transmitted to a common evaluation unit. The evaluation now proceeds in such way that the signal of the first light receiving arrangement, which is hit by the sensing beam, is only evaluated in regard to its relation to whether a workpiece is present at all. The second light receiving arrangement, which is hit by the reference beam deflected in synchronism with the sensing beam delivers the location information, that is where the workpiece has been sensed on its support surface. Since the reference beam extends only inside of the bar shaped housing and preferable from the deflecting device is directed immediately onto the second light receiving arrangement, this reference beam is not influenced by diffusion and other disturbances, so that its striking spot on the second light receiving arrangement can be essentially more precisely localized than it may be the case with the sensing beam on the first light receiving arrangement. By combining the two signals in the common evaluation unit a precise localizing of a workpiece on the supporting surface can result without being influenced at all by external disturbances.

The sensing beam and the reference beam can be derived from a common light source. It is however, simpler and more disturbance free to create each of the sensing beam and reference beam from its own light source.

To deflect the sensing beam and reference beam in synchronism with one another it is advantageous if the sensing beam and reference beam are deflected by the same deflecting device, for example by a rotatable mirror associated with both beams.

Preferably arranged between the rotatable mirror and the output window is at least one stationary mirror which is so positioned that the deflected sensing beam escapes from the output window of the housing at a pregiven angle. This way one obtains larger freedom for the arrangement of the light sources and the deflecting device inside of the housing. The stationary mirror or one of the stationary mirrors is preferably adjustable so as to be able to adjust the output direction of the sensing beam from the output window.

The light receiving arrangements are advantageously each made from a row of photoelectric elements which makes possible a very high spatial resolution.

The invention concerns further an abrading machine, especially a wide belt abrading machine, with a workpiece support surface on which flat workpieces are transported in a transport direction through the abrading machine, with a circulating abrading belt running parallel to the transport direction and with a presser bar extending across the width of the abrading belt and having a number of presser elements independently controllable from one another by a control unit. Such wide belt abrading machines are known as such and need not be described in more detail. In accordance with the invention the abrading machine includes a previously described apparatus for optically determining the surface contour of flat workpieces, with the bar shaped housing upstream of the abrading belt extending transversely to the transport direction across the workpiece support surface with the output window and the input window turned toward the workpiece support surface, and with the evaluation unit being connected to the control unit so that the determined surface contour can be used in control signals for controlling the presser elements of the presser bar.

The invention further concerns a method for examining the upper surface of a workpiece while abrading a flat workpiece in an abrading machine, in particular, a wide belt abrading machine. In the method the upper surface of the workpiece is sensed with at least one light beam, and the intensity of the light beam reflected from the upper surface of the workpiece is determined, and the values of the intensity determined are compared with reference values. In this manner the examining of the upper surface of the workpiece is accomplished before the abrading in order to adjust the abrading parameters in response to the properties of the upper surface of the workpiece. With the sensing of the upper surface of the workpiece after the abrading process the results of the abrading can be controlled in that the determined values are compared either with predetermined desired values or with the values determined before the abrading.

BRIEF DESCRIPTION OF THE DRAWINGS

The following description in combination with the accompanying figures explains the invention by way of exemplary embodiments. The figures are.

DETAILED DESCRIPTION OF THE INVENTION

Figure 1:
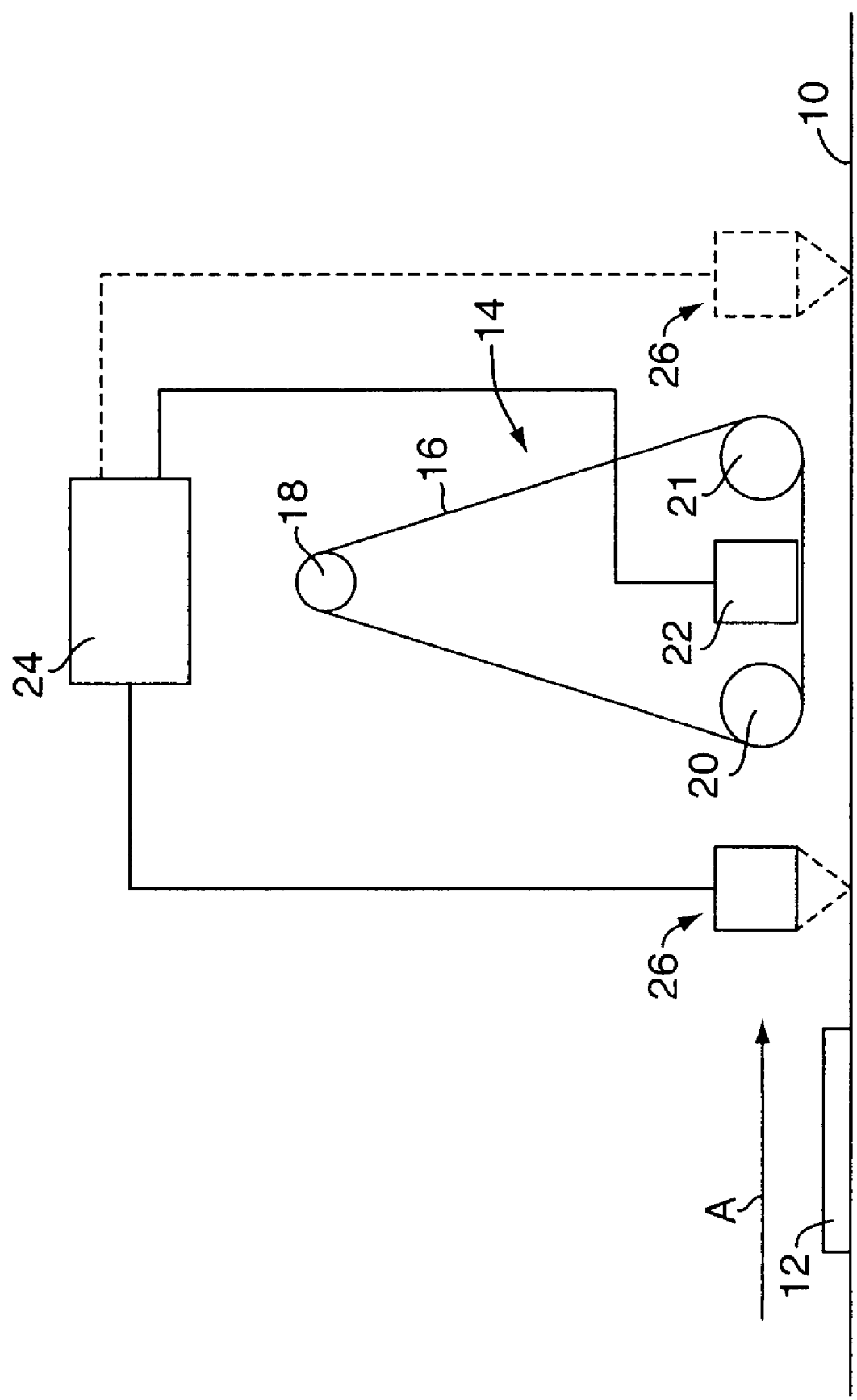
FIG. 1—is a schematic illustration of a wide belt abrading machine with an apparatus for optically determining the surface contour of flat workpieces, FIG. 2—is a schematic cross-section through the determining apparatus according to a first embodiment of the invention, FIG. 3—is a schematic cross-section through the determining apparatus according to a second embodiment of the invention, and FIG. 4—is a cross-section through the determining apparatus, and corresponding to that of FIG. 3, according to a third embodiment of the invention.

The wide belt abrading machine of FIG. 1 includes a transport belt 10 forming the workpiece support surface on which a workpiece 12 can be transported in the direction of the arrow A. Above the transport belt 10 is arranged an abrading device 14 with an abrasive belt 16, which belt is guided over a drive roll 21, a turning roll 20 and a tensioning roll 18, and which belt in the viewing direction of FIG. 1 extends transversely over the width of the transport belt 10. The abrading device 14 also includes a presser bar 22, which in known way consists of a number of pressure elements or presser shoes which transversely of the transport direction A are arranged next to one another and by way of a control unit 24 are individually and independently of one another controllable to press the abrading belt 16 onto the surface of the workpiece 12 in accordance with its contour.

To determine the contour of the workpiece and its position on the transport belt 10, a scanner bar 26 is arranged upstream of the abrading device 14, which scanner bar likewise extends transversely over the width of the transport belt 10, and whose construction and function will now be explained in more detail by way of FIG. 2.

Figure 2:
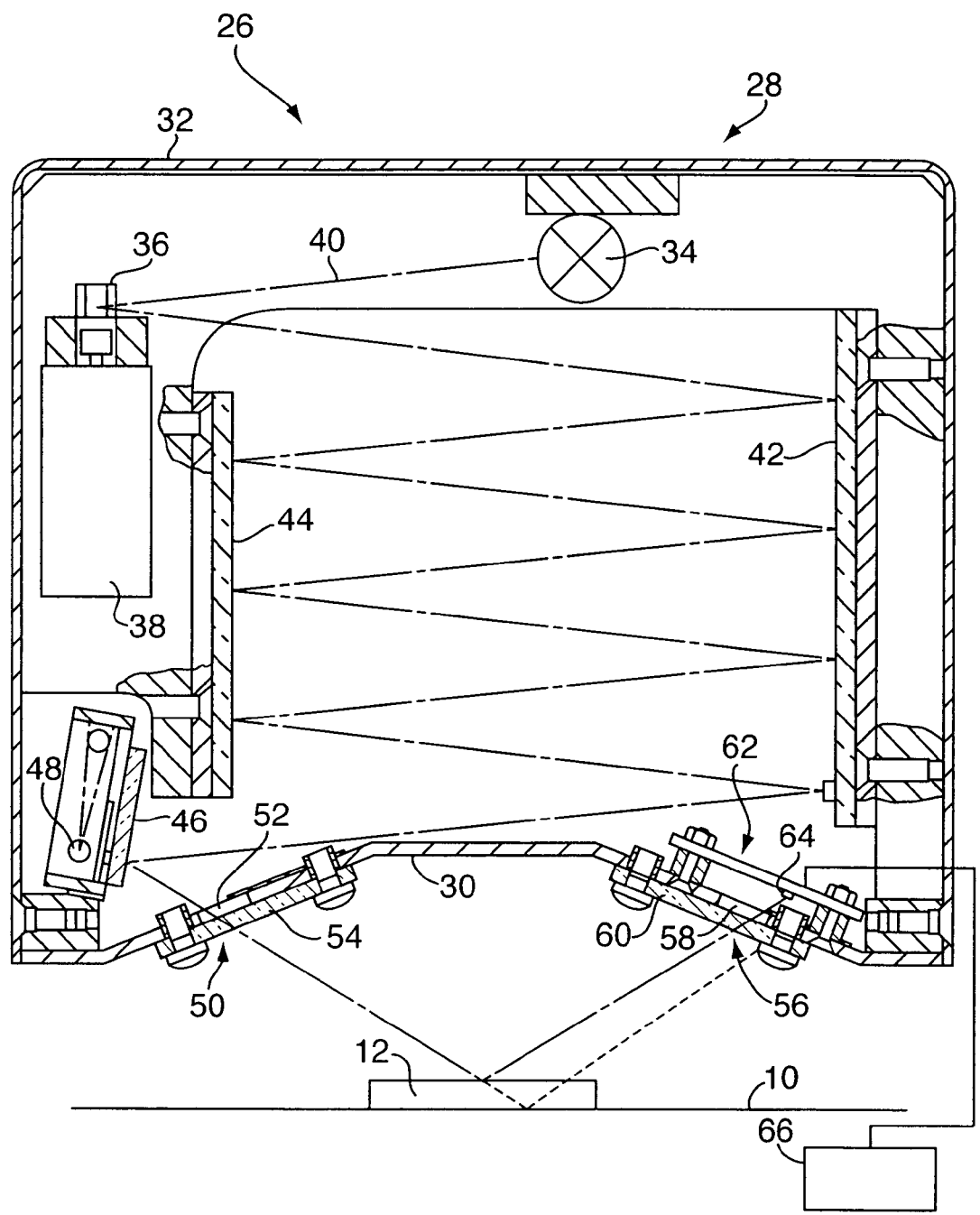

FIG. 2 shows the scanner bar 26 in a section perpendicular to the transport belt 10 and parallel to the transport direction A. The scanner bar 26 has a nearly cuboidal housing 28 with a bottom plate 30 and a cover bonnet 32. Near the top surface of the bonnet 32, inside of the housing 28 and at its middle in the longitudinal direction, is the light source 34 formed by a laser. The light source 34 is associated with a rotatable mirror 36 driven by a drive 38, so that the sensing beam 40 emitted from the light source 34, at a frequency dependent on the number of facets of the rotatable mirror 36 and the rotational speed of the drive 38, is deflected along the length of the housing 28. Associated with the rotatable mirror 36 are two stationary mirrors 42 and 44 which are parallel to one another and which extend over the length of the housing 28. The mirrors 42 and 44 are faced toward one another and have such a spacing from one another that the sensing beam 40 falling on the rotatable mirror 36 is reflected in several steps back and forth, as indicated in FIG. 2 by the zigzag beam path. Near the bottom plate 30 is arranged an adjustable mirror 46 which likewise extends over the entire length of the housing 28 and can be inclined about an axis 48. It deflects the sensing beam 40 through an output window 50 in the bottom plate 30. The output window is formed by a slot 52 extending over the length of the bottom plate and covered by a transparent plate 54 screw fastened to the bottom plate.

Near the other longitudinal edge of the bottom plate 30 is an input window 56 for the reflected sensing beam, which window 56 in the same way as the output window 50 is formed by an elongated slot 58 in the bottom plate covered by a transparent plate 60 fastened by screws to the bottom plate. Behind the input opening is a photodiode panel 62 forming the light receiving arrangement.

The sensing beam 40, with the help of the adjustable mirror 46, is so deflected through the output window 50 that it upon striking a workpiece 12 moves through the input window 56 and hits the photodiodes 64 of the photodiode panel 62, insofar as the thickness of the workpiece 12, by a certain tolerance, is not above or below a pregiven value. If on the other hand the sensing beam strikes the transport belt 10, that is the workpiece support surface, the beam reflected from it will not reach the slot 58 and therefore will also not reach the photodiode panel 62, as is indicated by the broken lines. Therefore, the surface contour of the workpiece 12 and its position on the transport belt can be determined. The photodiode row 62 is connected through an evaluation unit 66 with the control unit 24, which then based on the signals delivered by the photodiode row 62 or the evaluation unit 66 determines which segments of the presser bar 22 have to be controlled to press the abrasive belt in the desired way onto the upper surface of the workpiece 12. For this the signals received by the control unit from the evaluation unit 66 are amplified in the control unit in order to obtain the control signals for controlling the segments of the presser bar.

The signals delivered from the scanner bar can also be evaluated with respect to their intensity in the evaluation unit 66. This provides information concerning the load characteristics of the upper surface of the workpiece, for example, roughness, the structure and color of the same. This information can then be used to vary the abrading parameters such as abrading pressure and abrading speed desired, in order to achieve an optimal abrading result.

A further scanner bar 26 of the previously described type can also be arranged in the transport direction of the workpiece behind the abrading device 14. Also here the signals obtained from the evaluation unit 66 before their amplification can be evaluated as to their intensity. This provides information about the reflection properties of the workpiece top surface and allows, by comparison with reference values, a statement to be made about the quality of the workpiece top surface after the abrading process and with this the abrading results and accordingly the wear of the abrading means.

Figure 3:
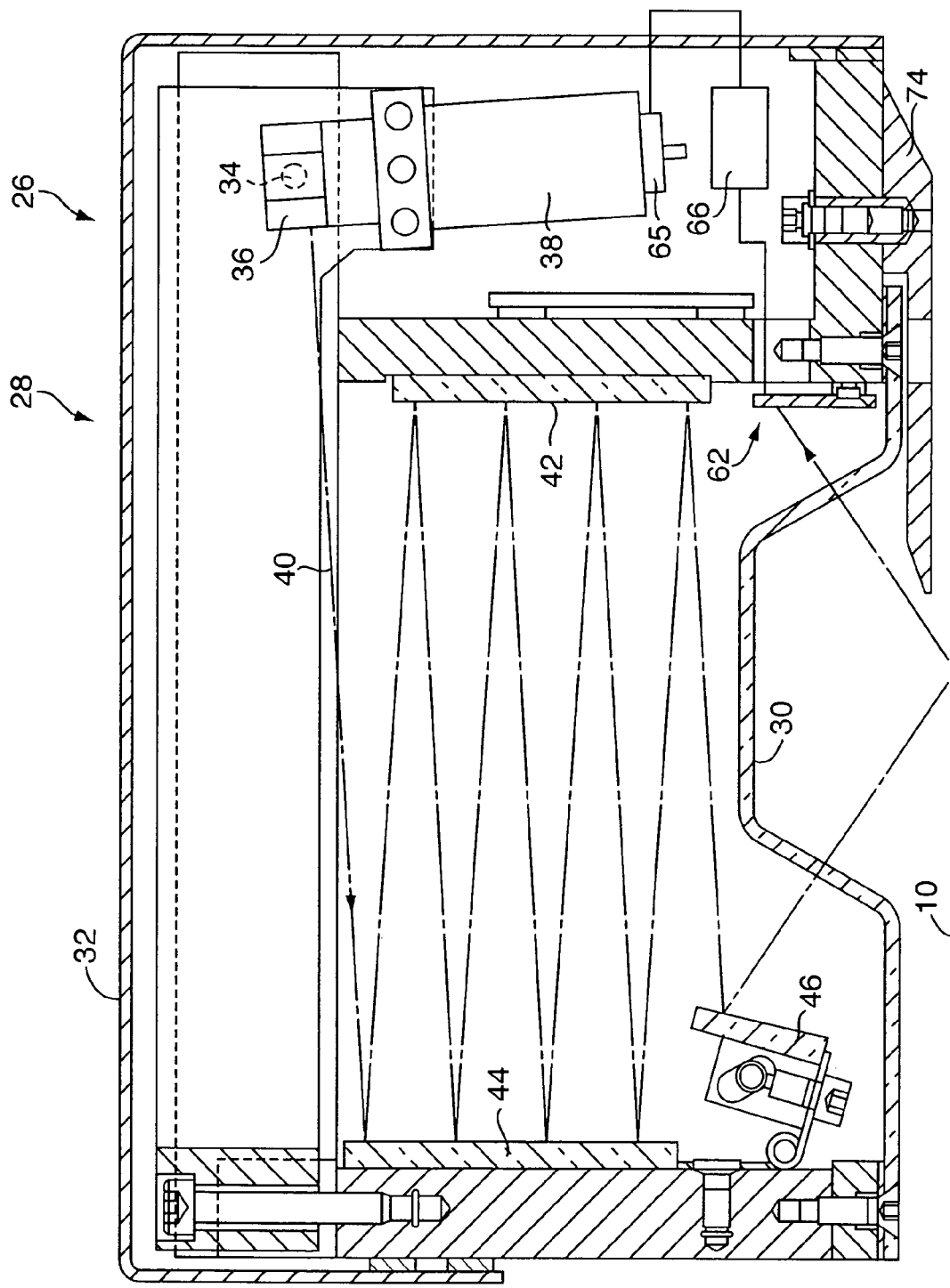

FIG. 3 shows a modified embodiment of the invention wherein parts corresponding to similar parts of the embodiment shown in FIG. 2 have been given the same reference numbers.

The sensing beam 40 experiences in its path from the rotatable mirror 36 and via the mirrors 42, 44 and 46 a certain widening. Further the light of the sensing beam at the workpiece is dispersed and by light reflection is "contaminated". This results in the light spot, which the light reflected from the workpiece creates on the photodiode row 62, being relatively wide, so that the location information is not so precise as it actually could be considering the construction of the photodiode row. This problem is solved by the embodiment according to FIG. 3 in that the rotatable mirror 36 or its drive 38 is coupled to an angular position sensor 65 whose output signal is transmitted to the evaluation circuit 66 to deliver information as to the direction of the sensing beam 40.

Figure 4:
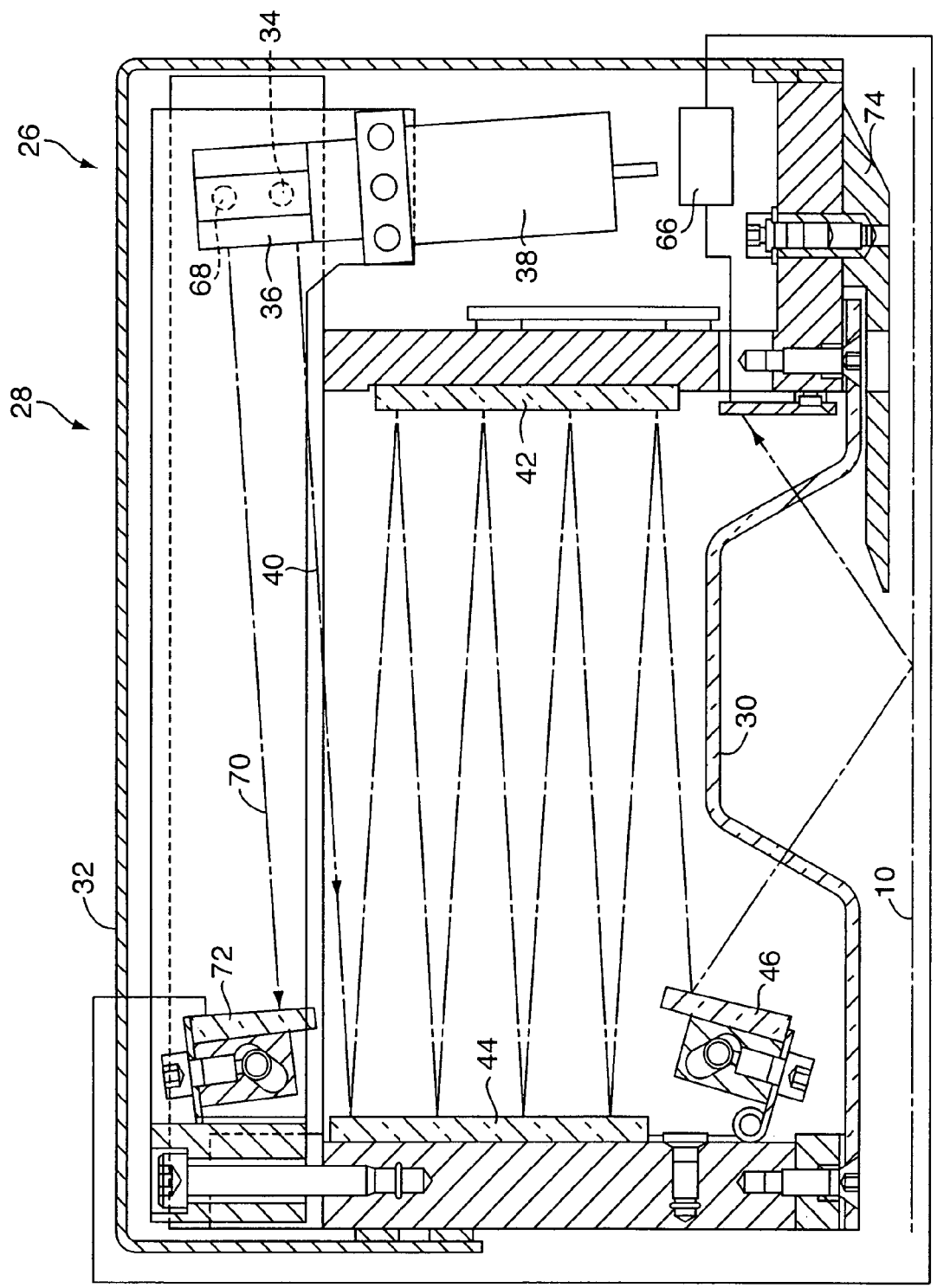

In the modified embodiment according to FIG. 4, instead of the angular position sensor, in addition to the light source 34 which produces the sensing beam is a further light source 68 which produces a reference beam 70, which in the illustrated embodiment is directed parallel to the sensing beam created by the light source 34 and which is deflected by the rotatable mirror 36 synchronously with the sensing beam 40. The reference beam 70 falls directly, or as the case may be by means of further deflecting element, onto a second light receiving arrangement, which likewise is formed by a photodiode panel 72. Since the reference beam 70 is subject to no disturbing influences, and from the rotatable mirror 36 falls onto the photodiode panel 72 without detour, it is still sharply bundled so that its strike location on the photodiode panel 72 can be precisely determined. Since the reference beam 70 is deflected in synchronism with the sensing beam 40, one from the reference beam can precisely determine the place where the sensing beam 40 would have to hit the photodiode panel 62 if it were in sharply bundled condition and without external disturbances to reach the photodiode panel 62. In the evaluation circuit the signals of both photodiode rows 62 and 72 are evaluated. The signal of the photodiode panel 62 is evaluated only with regard to whether the sensing beam has struck a workpiece or not. The place where the workpiece has been struck by the sensing beam, that is where the workpiece is located on the transport belt 10, on the other hand is determined from the signals from the photodiode row 72 which is hit by the reference beam 70. Therefore, the contour and the position of the workpiece 12 on the transport belt 10 can be determined with high spatial resolution and exactness entirely uninfluenced by external disturbances.

It is further to be added that in the embodiments according to FIGS. 3 and 4 the bottom plate 30 with individual windows has been replaced by a transparent bottom plate 30. Also, onto the underside of the scanner bar 26 is fastened by screws a ram protection plate 74, which serves to protect the scanner bar from blows from workpieces running from the right in FIG. 3 and which defines a limiting thickness of the workpiece. Further, this ram protector also serves to dim reflections from the transport belt. The ram protector can accordingly be adjustable in its position in order to specifically directed beams.

A German document attached hereto is hereby incorporated by reference.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An abrading machine with a workpiece support surface on which flat workpieces are transportable in a transport direction (A) through the abrading machine, a circulating abrading belt parallel to the transport direction, and a presser bar extending transversely to the transport direction across the width of the abrading belt with a plurality of presser elements which by way of a control unit are controllable independently of one another, having an apparatus for optically determining the surface contour of flat workpieces in a wide belt abrading machine, characterized by an elongated bar shaped housing which contains an optical sensing apparatus with at least one light source for creating a sensing beam and a deflecting device which moves the sensing beam back and forth between the longitudinal ends of the housing, and in that in one of its side walls the housing has an output window extending longitudinally of the housing for the sensing beam and an input window parallel to the output window for the sensing beam as reflected from the workpiece or from the workpiece support surface, with a row shaped light receiving arrangement being located behind the input window within the housing and having a plurality of optical sensors, the output signals of which sensors are transmittable to an evaluation unit, with the bar shaped housing upstream of the abrading belt extending transversely of the transport direction across the workpiece support surface with the output window and the input window turned toward the workpiece support surface, and with the evaluation unit being connected to the control unit.

2. The abrading machine according to claim 1, wherein the deflecting device includes an angular position sensor whose output signal contains information for determining the deflection direction of the sensing beam.

3. The abrading machine according to claim 1, wherein the sensing beam has associated with it a reference beam which inside of the housing is directed to a second row shaped light receiving arrangement with a plurality of optical sensors and is deflected along the same by means of a deflecting device in synchronism with the sensing beam, with the output signals of the two light receiving arrangements being sendable to a common evaluation unit.

4. The abrading machine according to claim 3, wherein the sensing beam and the reference beam are derived from a common light source.

5. The abrading machine according to claim 1 wherein for the creation of the sensing beam and of the reference beam a separate light source is respectively provided for each beam.

6. The abrading machine according to claim 3, wherein each light source is a laser.

7. The abrading machine according to claim 3, wherein the sensing beam and the reference beam are deflectable by the same deflecting device.

8. The abrading machine according to claim 1 wherein each deflecting device includes a rotatable mirror.

9. The abrading machine according to claim 3, wherein the reference beam from the deflecting device is directed immediately onto the second light receiving arrangement.

10. The abrading machine according to claim 2, wherein the rotatable mirror or its drive is coupled to an angular position detector.

11. The abrading machine according to claim 1, wherein between the deflecting device and the output window is at least one stationary mirror so positioned that the sensing beam as reflected by it is deflected at a predetermined angle through the output window.

12. The abrading machine according to claim 11, wherein the stationary mirror is adjustable to change the output angle of the sensing beam.

13. The abrading machine according to claim 1, wherein the light receiving arrangements are each formed by a row of photoelectric elements.

14. The abrading machine according to claim 1, wherein the evaluation unit is designed for determining and evaluating the intensity of the sensed beam reflected from the upper surface of the workpiece.

15. The abrading machine according to claim 1 wherein a further apparatus is arranged downstream of the abrading belt.

* * * * *